(No Model.) 3 Sheets—Sheet 1.

G. W. STEELE.
MACHINE FOR SHAPING MEETING RAILS FOR SASHES.

No. 290,809. Patented Dec. 25, 1883.

Witnesses
Richard D Healy
Jennie Inglis

Inventor
George W Steele
John Inglis atty (No Model.)
3 Sheets—Sheet 2.

G. W. STEELE.
MACHINE FOR SHAPING MEETING RAILS FOR SASHES.

No. 290,809.
Patented Dec. 25, 1883.

Witnesses
Richard A. Healy
Jennie Inglis

Inventor
George W. Steele
John Inglis atty (No Model.)

G. W. STEELE.

3 Sheets—Sheet 3.

MACHINE FOR SHAPING MEETING RAILS FOR SASHES.

No. 290,809. Patented Dec. 25, 1883.

Witnesses
Richard A. Healy
Jennie Inglis

Inventor
George W. Steele
John Inglis atty

UNITED STATES PATENT OFFICE.

GEORGE W. STEELE, OF PATERSON, NEW JERSEY.

MACHINE FOR SHAPING MEETING-RAILS FOR SASHES.

SPECIFICATION forming part of Letters Patent No. 290,809, dated December 25, 1883.

Application filed June 26, 1883. (No model.)

*To all whom it may concern:*

Be it known that I, GEORGE W. STEELE, a citizen of the United States, residing at Paterson, Passaic county, State of New Jersey, have invented a new and useful Improvement in Machines for Shaping Meeting-Rails for Sashes, of which the following is a specification, reference being had to the accompanying drawings, forming a part thereof.

The object of my invention is to mold, shape, separate, and complete a pair of meeting-rails for top and bottom sashes, the devices for the shaping, molding, separating, and completing of which are arranged on and secured to the same frames, and are to be actuated by the same general driving mechanism with the devices presented in a former application, and numbered 48,739, filed December 27, 1881.

Figures 1, 2:
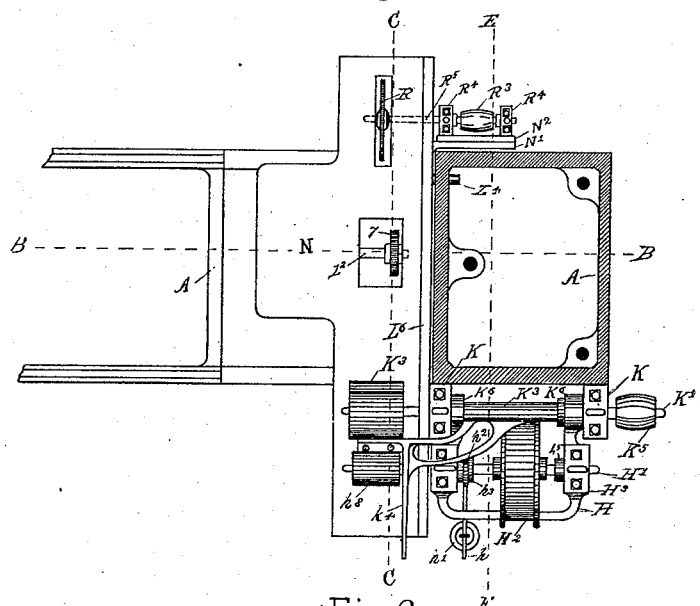
Figure 3:
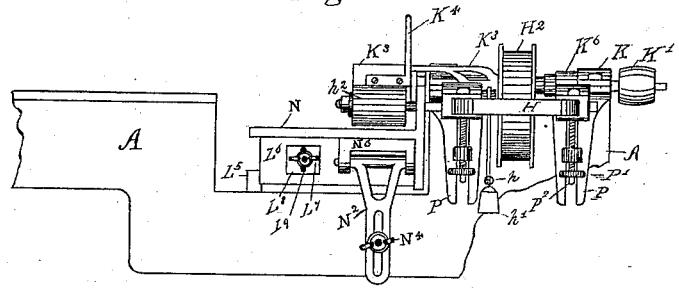
Figure 4:
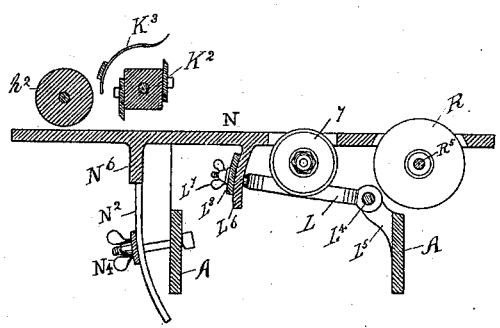
Figure 6:
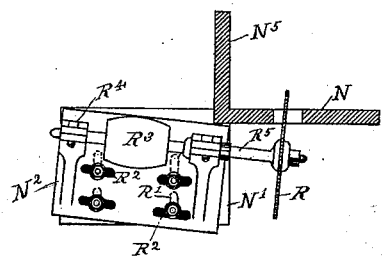
Figure 5:
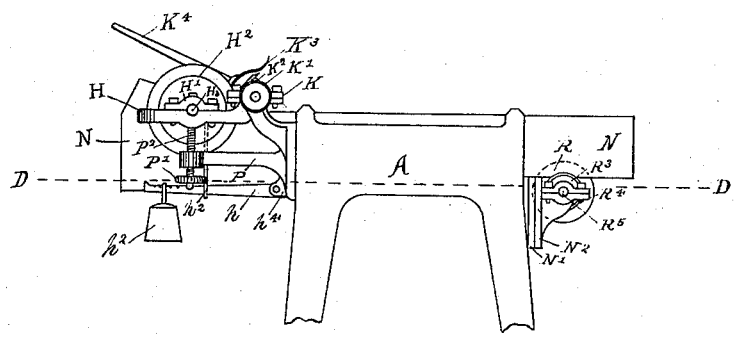
Figure 7:
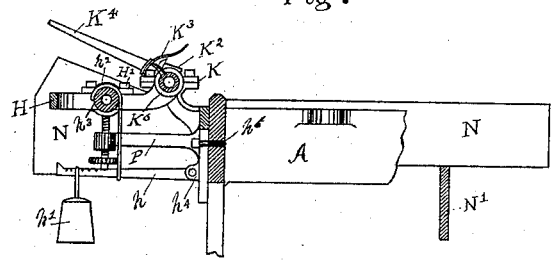
Figure 8:
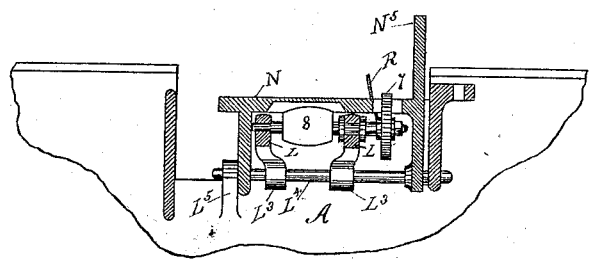

Figure 1 of the drawings is a plan. Fig. 2 is a plan, part sectional, taken on line D D of Fig. 5. Fig. 3 is a front view of the machine, showing the feed-roller and adjusting mechanism. Fig. 4 is a cross-section on line $c\,c$ of Fig. 1. Fig. 5 is an end elevation showing frame, feed-roller, parting-saw, &c. Fig. 6 is a front view of parting-saw, &c. Fig. 7 is a section on line E E of Fig. 1, and Fig. 8 is a section on line B B of Fig. 1.

A represents a metal frame, on which and to which frame are secured and arranged the various devices and driving mechanism, which will be hereinafter more fully explained. The frame H, shown in Fig. 1, is constructed with suitable arms to journal on collars $K^6$, formed therefor on the inner ends of bearings K that are secured to the frame A. In the bearings K there is journaled a shaft, K', provided with a pulley, $K^5$, and a cutter-head, $K^2$, that is covered with a suitable guard, $K^3$, shown in Fig. 7. The guard-frame $K^3$ is journaled over the shaft K' on the ends of the collars $K^6$, and is provided with a lever, $K^4$. The frame H, which pivots on the collars $K^6$, is provided with suitable bearings, $H^3$, to journal a shaft, H', which shaft is journaled therein, and is provided with a pulley, $H^2$, and a feed-roller, $h^8$, and collars $h^5$. The frame L (shown in Fig. 2) is constructed with arms $L^3$, that pivot on a stationary pivot-rod, $L^4$, the rod $L^4$ being secured in projecting arms $L^5$, that are suitably secured to the frame A. The frame L is provided with suitable bearings, L', in which to journal a shaft, $L^2$, which shaft is journaled therein, and is provided with a pulley, 8, and a cutter-head, 7. The frame L is arranged in a hanging bracket, $L^6$, having a suitable slot, 81, therefor, and is secured therein by means of a thumb-screw, $L^7$, that screws on the stud 9 and against a plate or washer, $L^8$, that covers the slot 81. The frame N, which frame is also pivoted on the stationary pivot-rod $L^4$, is held by means of a thumb-screw, $N^4$, to a stud, $L^9$, secured to the frame A. On the frame N there is secured a plate, N', to which there is suitably secured, by bolts that are arranged in transversely-arranged slots R' $R^2$, a plate-bracket, $N^2$, provided with suitable bearings, $R^4$, to journal a shaft, $R^5$, having a pulley, $R^3$, on the end of which shaft there is suitably arranged and secured a parting-saw, R.

Operation: The rails to be manipulated are placed on the frame or table N, back of the feed-roller $h^8$, and pass under the same, the draft of which passes the rails to and under the over head, $K^2$, where the rails for the bottom sashes have the molding worked thereon; also, the plow or groove for the glass. The rails pass from the over head $K^2$, to the under head, 7, and over the same, where the rabbet for the top sashes is formed on the rails while the same are passing. The rails pass from the under head, 7, to the parting-saw R, where the rails for top and bottom sashes are cut apart and separated at any desired angle by means of the arrangement of plates N' $N^2$ and transversely-arranged slots R' $R^2$, by which means the saw R can be arranged to cut at any angle desired, Fig. 6. A suitable draft can be given to feed-roller $h^8$ by means of the adjusting-screws $P^2$ by turning the hand-wheel P', the same actuating the frame H upwardly, to lighten the draft on the work when there is too much pressure on the same from the weighted frame. The lever $h$, weight $h'$, acting on the rod $h^2$, which embraces the hub $h^3$ on shaft H', serves to keep the feed-roller $h^8$ down on the work under process of manipulation. The collars $h^5$ serve to keep the shaft H' from lateral motion. The depth of the rabbet which is made by the cutter-head 7 is regulated by raising or lowering the head 7, which is adjustably arranged, and which is held to its adjustment by a thumb-screw, L⁷. The frame L is made adjustable laterally on the rod L⁴ to suit the different widths of rails to be manipulated by the head 7. The frame or table N, which is adjustably arranged, can be raised or lowered to suit the different thicknesses of rails to be manipulated to the cutter-head K². The adjusting-screw P' works in and through an arm, P, that is secured to the frame A by a bolt, h⁶. The lever h is adjustable on the pivot h⁴.

Having described my invention and its operation, I claim and desire to secure by Letters Patent—

1. The combination, with rotary cutter-head and its shaft, having a driving-pulley thereon, of the frame pivoted on collars and carrying a feed-roller with its shaft, and the weighted frame pivoted to the main frame and bearing on the feed-roller supporting-frame, substantially as described.

2. The combination, with the main frame A, of the table N, turning upon pivot-rod L⁴, secured to the main frame, and adjustably secured at its opposite end to a stud on the main frame, and the frame L, pivoted to said rod L⁴, and carrying cutter-head 7, the outer end of said frame adjustably secured to a depending lug upon the table N, substantially as described.

3. The combination, with cutter-head K² and feed-roller h⁸, supported in the main frame, of the adjustable frame N, pivoted to the main frame and carrying the lower cutter-head adjustably therein, substantially as described.

4. The combination, with the cutter-head K² and feed-roller h⁸, supported in the main frame, of the adjustable table N, pivoted to the main frame and carrying the lower cutter-head, 7, adjustably therein, and the saw R, supported in a bracket in said table, which bracket is adjustable about a center in a plane at right angles to the plane of the saw, substantially as described.

GEORGE W. STEELE.

Witnesses:
  JOHN INGLIS,
  JENNIE INGLIS.